United States Patent
Viaro et al.

(10) Patent No.: US 7,417,840 B2
(45) Date of Patent: Aug. 26, 2008

(54) SELF-SUPPLIED ELECTRONIC PROTECTION DEVICE FOR AUTOMATIC CIRCUIT-BREAKERS

(75) Inventors: Francesco Viaro, Albino (IT); Marco Stucchi, Osio Sotto (IT)

(73) Assignee: ABB S.p.A. (IT)

( * ) Notice: Subject to any disclaimer, the term of this patent is extended or adjusted under 35 U.S.C. 154(b) by 384 days.

(21) Appl. No.: 11/107,774

(22) Filed: Apr. 18, 2005

(65) Prior Publication Data
US 2005/0231875 A1 Oct. 20, 2005

(30) Foreign Application Priority Data
Apr. 19, 2004 (IT) ............... MI2004A0759

(51) Int. Cl.
*H02H 3/08* (2006.01)
(52) U.S. Cl. ............ 361/93.1; 361/18; 361/94; 361/115
(58) Field of Classification Search .......... 361/94–97, 361/18, 93.1, 93.2, 115
See application file for complete search history.

(56) References Cited
U.S. PATENT DOCUMENTS 3,465,206 A * 9/1969 Lincoln et al. ............... 361/29
6,167,329 A * 12/2000 Engel et al. ............... 361/93.2
6,295,190 B1 * 9/2001 Rinaldi et al. ............... 361/115
6,731,487 B2 * 5/2004 Fletcher et al. ............ 361/93.2

* cited by examiner

*Primary Examiner*—Stephen W Jackson
*Assistant Examiner*—Terrence R Willoughby
(74) *Attorney, Agent, or Firm*—Connolly Bove Lodge & Hutz LLP; Myron Keith Wyche

(57) ABSTRACT

An electronic self-supplied protection device for automatic circuit-breakers that includes: a supply device that draws energy from the stretch of electrical network protected by said circuit-breaker; a control device with at least two levels of operation, where the first of the at least two levels of operation being associated to the function of protection from instantaneous short-circuit SCinst. In addition, second and possible further levels of operation of the self-supplied protection device are associated with further functions of said protection device; a selective interface device including means for regulating the supply, which, in a first step, immediately following upon closing of the circuit by the circuit-breaker, supply the first level of operation, and, after a controlled period of time, supply also the second and possible further levels of operation of said control device.

17 Claims, 1 Drawing Sheet

SELF-SUPPLIED ELECTRONIC PROTECTION DEVICE FOR AUTOMATIC CIRCUIT-BREAKERS

FIELD OF THE INVENTION

The present invention relates to electronic protection devices provided with a self-supply system and equipped with a microcontroller (said protection devices being referred to briefly hereinafter as relays), for automatic circuit-breakers (hereinafter referred to briefly as circuit-breakers).

By "self-supplied relays" are meant relays capable of functioning also without a specific auxiliary supply, using that is, for their operation, energy drawn, via a supply device, directly from the stretch of electrical network protected by the circuit-breaker. The supply device of the relay is typically constituted by one or more current transformers that draw energy from the stretch of electrical network protected by the circuit-breaker, and by electronic circuits, which supply an adequate electrical supply to the relay.

BACKGROUND OF THE INVENTION

As is known from the prior art, amongst the various functions performed by a relay, the main one is that of detecting failures and faults and of controlling opening of the circuit by the circuit-breaker. Amongst the possible failures there exist, in particular, initial instantaneous short circuits, characterized by currents Iinst, which can cause enormous and irreversible damage even in periods of time in the region of a few milliseconds. By "initial instantaneous short-circuit", hereinafter referred to as SCinst, is meant a short-circuit already present at the moment of, or concomitant with, closing of the circuit by the circuit-breaker. Said short circuits are particularly critical since they require the circuit-breaker and the relay to carry out opening immediately, as soon as the circuit is closed.

It should, however, be recalled that, as soon as the circuit-breaker is in the closing condition, for the relay to be able to function properly it is necessary to wait a short but significant start-up time, in which the electrical and electronic parts are subject to a transient that brings them up to steady-state conditions. Once this time has elapsed, the relay is able to perform the normal functions of protection and to control opening of the circuit by the circuit-breaker.

One of the data characterizing relays is hence the start-up time Tsu of the relays themselves.

The start-up time Tsu depends upon different factors, listed below:
- power-supply start-up time (Tps) of the supply device of the relay defined above, said supply device having as input the stretch of electrical network protected by the circuit-breaker and as output a supply adequate for the characteristics of the relay;
- characteristic time of stabilization of the hardware components of the relay (Thw) necessary for operation of the microcontroller (for example, the oscillator);
- characteristic time of initialization of the software (Tsw) present in the microcontroller;
- time for calculating the currents (Tc), i.e., the time necessary for processing the signal coming from the current sensors in a form useful for generating the signal for actuation of the protections.

Neglecting any partial possible superposition, it may be said that the start-up time Tsu is given by the sum of these partial times, namely, Tsu=Tps+Thw+Tsw+Tc. A circuit-breaker that does not envisage any additional strategy, during the time Tsu is consequently virtually unable to provide any protection. Hence, any failure or fault that may occur in the part of the system protected by the circuit-breaker during this time Tsu cannot be adequately interpreted by the relay.

In the known art, progressively more rapid systems and components have been studied and introduced, capable of reducing the time Tsu to values in the region of 15 ms. At the current state of the art, just the reduction of Tsu is therefore insufficient to set a circuit-breaker in conditions of safety in the case of instantaneous short circuits. In fact, in the case of instantaneous short circuits (SCinst), tripping is desirable in times in the region of 2 ms.

Other systems of the known art solve the problem of protection of instantaneous short circuits (SCinst) by providing alongside the main protection device, other additional protection devices, which are very fast in the initial transient and are capable of tripping with marked anticipation with respect to the main protection device. The additional protection devices adopted in the known art for performing the protection function SCinst are based upon one of the two following types of solutions:

i) magnetomechanical solutions, obtained for example with sensors and actuators set in the proximity of the conductors; and ii) electronic solutions with simple components (made, for example, with passive comparators), which do not envisage a microcontroller and are thus subject Tps alone.

The additional protection devices based upon these two solutions are generally far inferior, from the standpoint of precision and the possibility of calibration, to the main protection device, but in comparison with the latter they present the advantage of reacting in much shorter time intervals. They are normally calibrated in a fixed way so that they trip at current levels that are certainly dangerous, namely when the lack of interruption of the main circuit in times shorter than the time Tsu defined above is likely to expose the stretch of electrical network protected by the circuit-breaker or the circuit-breaker itself to permanent damage.

SUMMARY OF THE INVENTION

The subject of the present invention is a protection device of an innovative type equipped with a microcontroller that makes the protection function SCinst available in a very short time and exploiting all the potential of a microcontroller, without the use of additional protection devices.

The invention is obtained by providing the relay with at least two different levels of operation, namely, a first level of operation, in which the protection function SCinst is rapidly made available, and at least one second level of complete operation, in which also other functions of the relay are made available.

The above two levels of operation can be obtained indifferently by means of separate microcontrollers (for example, at least one for performing the protection function SCinst and at least one for performing the other protection functions of the relay), or else with just one microcontroller provided with at least one section, with privileged activation, for performing the function SCinst, and at least one other section for performing the other protection functions of the relay.

The first level of operation, which has priority over the second, is activated using all the energy that can be drawn from the network at the moment of closing of the circuit by the circuit-breaker.

The second level, corresponding to other functions of the relay, which are less critical from the standpoint of immediate availability, is activated subsequently.

This solution consists in conveying immediately, using strategies that enable at least a significant reduction in the time Tsu, all the energy, thus enabling implementation of instantaneous protection directly on the microcontroller, also and above all with self-supplied relays.

The execution of instantaneous protection within the microcontroller enables various advantages to be obtained, amongst which the execution of complex algorithms, the complexity of which is limited by just the power of calculation of the microcontroller or the number of functions available to the operator. Examples of such algorithms and functions that are not obtainable at a low cost using other solutions are:

- elimination of the need for additional devices as compared to traditional relays which render the circuit-breaker more complex and less reliable;
- possibility of programming the tripping threshold Iinst according to continuous or discrete functions;
- modification of said thresholds or other parameters of the algorithm by the operator by means of an interface of any type in a precise and simple way (in digital form, instead of mechanically or by means of trimmers);
- sampling of characteristics of the circuit-breaker (typically tripping thresholds) by an electronics associated thereto, in such a way that the relay adapts automatically to the circuit-breaker on which it is installed;
- digital communication with other relays, for example for interlocking functions; and
- recording and saving of the phenomena detected in RAMs or non-volatile memories, so as to offer to the operator a better diagnostics of the failures detected through local or remote interfaces, typically SCinst failures not that cannot be detected with traditional systems.

Other advantages that can be obtained are, for example, linked to the reduction in costs, using the same hardware (H/W) already present for the other protections.

The above and other advantages that will appear more clearly from what follows are achieved by an electronic self-supplied protection device for automatic circuit-breakers according to the invention, comprising:

- a supply device that draws energy from the stretch of electrical network protected by said circuit-breaker;
- a control device comprising at least two levels of operation, the first of said at least two levels of operation being associated to the function of protection from instantaneous short-circuit SCinst, the second and possible further levels of operation being associated to further functions of said protection device; and
- a selective interface device comprising means for regulating the supply, which, in a first step, immediately subsequent to closing of the circuit by the circuit-breaker, supply said first level of operation, and, after a controlled period of time, supply also said second and possible further levels of operation of said control device.

In the electronic self-supplied protection device according to the present invention, the control device may conveniently comprise a microcontroller having two sections that can be supplied separately, a first section being associated to the first of said at least two levels of operation, and a second section being associated to the second of said at least two levels of operation.

Alternatively, according to a preferred embodiment, said control device can comprise a first microcontroller and a second microcontroller, the first microcontroller being associated to the first of said at least two levels of operation, and the second microcontroller being associated to the second of said at least two levels of operation. In this case, said first microcontroller can advantageously be of a low-power type with reduced times for reaching steady-state conditions.

In the case where at least two microcontrollers are present, said first microcontroller is advantageously associated to the function of protection from instantaneous short-circuit SCinst and to the function of internal clock. For this purpose, a microcontroller with internal oscillator can conveniently be used.

In the electronic self-supplied protection device according to the present invention, the supply device preferably comprises one or more current transformers that draw energy from the conductors of the stretch of electrical network protected by the circuit-breaker.

Preferably, in the electronic self-supplied protection device according to the invention, said means of regulation comprise a first supply regulator designed to supply said first level of operation and, even more preferably, a second supply regulator designed to supply also said second and possible further levels of operation. By the expressions "designed to supply said first level of operation" and "designed to supply also said second and possible further levels of operation" is meant that said first and second supply regulators are respectively designed to supply the hardware portions associated to said first, second and possible further levels of operation.

According to a particular embodiment of the electronic self-supplied protection device according to the invention, said first level of operation comprises management of the activation at least of said second level of operation as a function of the supply energy available.

Preferably, said device for controlling the electronic self-supplied protection device according to the invention is associated to high-speed current sensors, which can advantageously be constituted by Rogowski coils.

In general, it may also be stated that the present invention relates to an electronic self-supplied protection device for automatic circuit-breakers that is characterized in that it comprises an electronic control device having a time of activation of the function SCinst of less than or equal to 2 ms.

For a better understanding of the present invention, reference is made to the accompanying drawings and to the detailed description hereinafter, in which preferred but non-limitative embodiments of the electronic self-supplied protection device according to the invention are illustrated.

DESCRIPTION OF THE PREFERRED EMBODIMENTS

Figure 1:
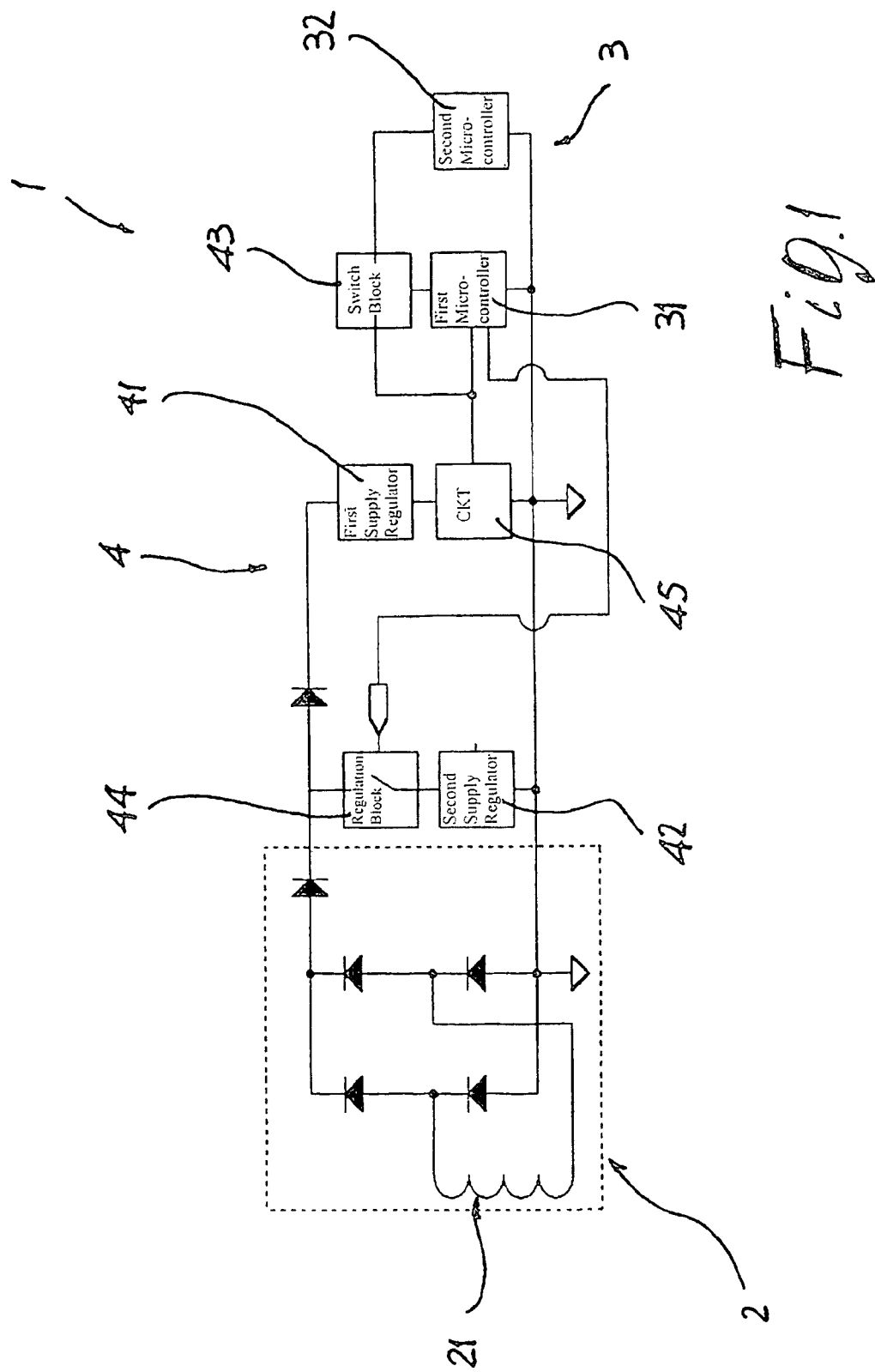
FIG. 1 is a block diagram illustrating an embodiment of an electronic self-supplied protection device according to the invention.

With reference to FIG. 1, the electronic self-supplied protection device according to the invention, designated as a whole by the reference number 1, comprises a supply device 2 that draws energy from the stretch of electrical network protected by the circuit-breaker to which the protection device itself is associated. Preferably, the supply device 2 comprises one or more current transformers 21 which draw energy from the conductors of the stretch of electrical network protected by said circuit-breaker.

The device according to the invention moreover includes a control device 3, which comprises at least two levels of operation, the first of said at least two levels of operation being associated to the function of protection from instantaneous short-circuit SCinst, the second and possible further levels of operation being associated to further functions of said protection device. There is moreover present a selective interface device 4, which comprises means for regulating the supply 41 and 42, which, in a first step, immediately following upon closing of the circuit by the circuit-breaker, supply said first level of operation, and, after a controlled period of time, supply also said second and possible further levels of operation of said control device.

According to a first embodiment of the electronic self-supplied protection device 1 according to the present invention, the control device 3 can conveniently comprise a microcontroller having two sections 31 and 32 that can be supplied separately, a first section 31 being associated to the first of said at least two levels of operation, and a second section 32 being associated to the second of said at least two levels of operation.

Alternatively, according to a preferred embodiment, said control device 3 can comprise a first microcontroller 31 and a second microcontroller 32, the first microcontroller 31 being associated to the first of said at least two levels of operation, the second microcontroller 32 being associated to the second of said at least two levels of operation. Furthermore, the first microcontroller 31 can be advantageously associated to the function of protection from instantaneous short-circuit SCinst and to the function of internal clock. For this purpose, a low-power microcontroller with internal oscillator can conveniently be used.

According to the embodiment of FIG. 1 of the electronic self-supplied protection device according to the invention, the means of regulation 4 comprise a first supply regulator 41 designed to supply said first level of operation and, even more preferably, a second supply regulator 42 designed to supply also said second and possible further levels of operation. The first supply regulator 41 is generally less powerful but much faster, normally suitable for low-power microcontrollers alone. The second supply regulator 42 is, instead, more powerful, and is suited to the high absorption levels of the microcontroller when it implements all the functions (in the case where just one microcontroller is present), or else of the second microcontroller 32, which performs the functions typical of the second level of operation (as in the case of FIG. 1).

The means of regulation 4 can moreover comprise a regulation block 44, which, when the circuit is open, generates a high voltage between the first supply regulator 41 and the ground that is exploited by said first supply regulator 41. When the circuit is closed, it enables, instead, delivery of more power to the second supply regulator 42.

According to a particular embodiment of the electronic self-supplied protection device according to the invention, the first microcontroller 31 manages the activation at least of the second microcontroller 32, through the block 43, according to the supply energy available.

The solution adopted in the present invention, which envisages the use of two levels of operation, enables a marked reduction in the start-up time by optimizing all the elements that constitute the devices of the invention and in particular by means of:

a) the use of a power supply 2 and of an interface 4 that will enable drawing of energy as fast as possible from the current transformers used as source of external supply, exploiting the sensors in open circuit and taking the voltage across them; the same power supply supplies the voltage necessary to the actuator for causing opening of the circuit by the circuit-breaker;

b) the use of a microcontroller 31 with an internal oscillator that enables a very reduced time for reaching a steady-state condition, even shorter than 10 μs; the same microcontroller guarantees low absorption levels (in the region of 2 mA in normal operating conditions) compatible with the self-supply;

c) since the microcontroller 31 is characterized by a smaller number of functions (typically SCinst and clock), there is a drastic reduction in the times of initialization of the microcontroller, which are practically limited to the H/W characteristics (peripheral) and S/W characteristics (data structures for algorithms) that must be used for the protection function Scinst; and d) the use of Rogowsky coils as current sensors, which, by producing a signal proportional to the derivative of the current, anticipate in actual fact the current signal by 90° (corresponding to 5 ms at 50 Hz), in this way enabling early intervention by the protection algorithms.

By virtue of said solutions, the device according to the invention is able to implement the instantaneous protection with a time of roughly 1.5 ms, of which typically 1 ms is used for point a), and 500 μs are used for points b) and c). From this point on, the microcontroller is ready to trip, and the tripping time depends upon by the algorithm or algorithms. It may therefore be stated that the electronic self-supplied protection device for automatic circuit-breakers according to the invention is characterized in that it comprises an electronic control device having a time for activation of the function SCinst of less than or equal to 2 ms.

The electronic self-supplied protection device according to the invention finds convenient application in automatic circuit-breakers and in particular in low-voltage automatic circuit-breakers.

The electronic self-supplied protection device thus conceived may undergo numerous modifications and variations, all of which fall within the scope of the inventive idea; moreover, all the items may be replaced by other technically equivalent ones.

We claim:

1. An electronic self-supplied protection device for automatic circuit-breakers, comprising:

a supply device that draws energy from an electrical network protected by said circuit-breaker;

a control device comprising at least two levels of operation, a first level of said at least two levels of operation being associated with the function of protection from instantaneous short-circuit (SCinst), a second and further levels of operation being associated with further functions of said protection device; and a selective interface device comprising a first supply regulator for regulating a power supply to said first level of operation, immediately following upon closing of a circuit by the circuit-breaker and, a second supply regulator for regulating the power supply to said second and further levels of operation of said control device, after a controlled period of time, wherein said selective interface device further comprises a regulation block, said regulation block generating a high voltage between the first supply regulator and ground when the circuit is open, said regulation block enabling a delivery of more power to the second supply regulator when the circuit is closed.

2. An electronic self-supplied protection device according to claim 1, wherein said control device comprises a microcontroller comprising two sections that can be supplied separately, a first section being associated to the first of said at least two levels of operation, and a second section being associated to the second of said at least two levels of operation.

3. An electronic self-supplied protection device according to claim 1, wherein said control device comprises a first microcontroller and a second microcontroller, the first microcontroller being associated to the first of said at least two levels of operation, the second microcontroller being associated to the second of said at least two levels of operation.

4. An electronic self-supplied protection device according to claim 3, wherein said first microcontroller is of a low-power type with reduced times for reaching steady-state condition.

5. An electronic self-supplied protection device according to claim 3, wherein said first microcontroller is associated to the function of protection from instantaneous short-circuit (SCinst) and to the function of internal clock.

6. An electronic self-supplied protection device according to claim 1, wherein supply device comprises one or more current transformers.

7. An electronic self-supplied protection device according to claim 1, wherein said means of regulation comprise a first supply regulator designed to supply said first level of operation.

8. An electronic self-supplied protection device according to claim 7, wherein said means of regulation comprise a second supply regulator designed to supply also said second and possible further levels of operation.

9. An electronic self-supplied protection device according to according to claim 1, wherein said first level of operation comprises managing activation of at least said second level of operation according to the supply energy available.

10. An electronic self-supplied protection device according to claim 1, wherein said control device is associated to high-speed current sensors.

11. An electronic self-supplied protection device according to claim 10, wherein said high-speed current sensors are Rogowski-coil current sensors.

12. An electronic self-supplied protection device according to claim 1, for automatic circuit-breakers comprising, the control device having a time of activation of the function (SCinst) of less than or equal to 2 ms.

13. An automatic circuit-breaker comprising an electronic self-supplied protection device according to claim 1.

14. A low-voltage automatic circuit-breaker comprising an electronic self-supplied protection device according to claim 1.

15. An electronic self-supplied protection device according to claim 4, wherein said first microcontroller is associated to the function of protection from instantaneous short-circuit (SCinst) and to the function of internal clock.

16. An automatic circuit-breaker comprising an electronic self-supplied protection device according to claim 12.

17. A low-voltage automatic circuit-breaker comprising an electronic self-supplied protection device according to claim 12.

* * * * *